United States Patent
Nishimura et al.

(10) Patent No.: US 10,108,103 B2
(45) Date of Patent: Oct. 23, 2018

(54) IMAGE FORMING APPARATUS INCLUDING DISPLAYED NOTIFICATION TO PROMPT CLEANING OF CHARGER AND STORAGE MEDIUM

(71) Applicant: Sharp Kabushiki Kaisha, Sakai, Osaka (JP)

(72) Inventors: Yasuhiro Nishimura, Sakai (JP); Hideji Saikoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/596,080

(22) Filed: May 16, 2017

(65) Prior Publication Data
US 2017/0346980 A1 Nov. 30, 2017

(30) Foreign Application Priority Data
May 27, 2016 (JP) .................. 2016-106233

(51) Int. Cl.
G03G 15/02 (2006.01)
H04N 1/00 (2006.01)
G03G 15/00 (2006.01)

(52) U.S. Cl.
CPC ..... *G03G 15/0225* (2013.01); *G03G 15/0258* (2013.01); *G03G 15/0291* (2013.01); *G03G 15/553* (2013.01); *H04N 1/00411* (2013.01); *H04N 1/00602* (2013.01); *H04N 1/00909* (2013.01); *G03G 15/502* (2013.01)

(58) Field of Classification Search
CPC ........... G03G 15/0225; G03G 15/0258; G03G 15/0291; G03G 15/5016; G03G 15/502; G03G 15/553; G03G 15/55; G03G 21/20; H04N 1/00909
USPC ............................... 399/34, 50, 81, 100, 168
See application file for complete search history.

(56) References Cited

U.S. PATENT DOCUMENTS

| | | | | |
|---|---|---|---|---|
| 5,223,895 A * | 6/1993 | Saitoh | ................ | G03G 15/5087 399/10 |
| 6,205,303 B1 * | 3/2001 | Fujii | .................. | G03G 15/0258 399/100 |
| 6,711,363 B1 * | 3/2004 | Wayman | ............ | G03G 15/0258 399/100 |
| 8,886,065 B2 * | 11/2014 | Kondo | .................. | G03G 15/55 399/100 |

(Continued)

FOREIGN PATENT DOCUMENTS

JP 2000147873 A * 5/2000
JP 3259515 B2 2/2002

(Continued)

*Primary Examiner* — Robert Beatty
(74) *Attorney, Agent, or Firm* — Keating & Bennett, LLP

(57) ABSTRACT

An image forming apparatus that includes a charger for charging a surface of a photoreceptor and that forms an image by using an electrophotographic system, the charger being configured to be cleanable, includes a guidance notification unit that causes a guidance notification prompting cleaning of the charger to be displayed and a guidance notification determination unit that, in accordance with a threshold set in accordance with usage condition of the image forming apparatus, determines whether or not to cause the guidance notification to be displayed.

10 Claims, 11 Drawing Sheets

(56) References Cited

U.S. PATENT DOCUMENTS

| | | | | |
|---|---|---|---|---|
| 2006/0045559 A1* | 3/2006 | Zona | ............... | G03G 15/0258 399/100 |
| 2008/0069577 A1* | 3/2008 | Sakato | ............... | G03G 15/0258 399/44 |
| 2009/0009793 A1* | 1/2009 | Ozawa | ............... | G03G 15/55 358/1.15 |
| 2009/0060554 A1* | 3/2009 | Kosuge | ............... | G03G 15/0225 399/71 |
| 2010/0020357 A1* | 1/2010 | Amino | ............... | G03G 15/553 358/1.15 |
| 2010/0086316 A1* | 4/2010 | Sekovski | ............... | G03G 15/0258 399/8 |
| 2011/0200352 A1* | 8/2011 | Yamashita | ............... | G03G 15/0258 399/100 |
| 2014/0300677 A1* | 10/2014 | Yoshida | ............... | G03G 15/0435 347/133 |

FOREIGN PATENT DOCUMENTS

| | | | | | |
|---|---|---|---|---|---|
| JP | 2005107200 A | * | 4/2005 | | |
| JP | 2006251621 A | * | 9/2006 | | |
| JP | 2012027191 A | * | 2/2012 | ............ | B32B 33/00 |
| JP | 2016-009001 A | | 1/2016 | | |

\* cited by examiner

FIG. 5A

BASIC DISCHARGING TIME OF CHARGER AT TIMING OF
DISPLAYING CLEANING GUIDE NOTIFICATION

| 29.1 hours | 25000 SHEETS |
|---|---|

FIG. 5B

| PRINTING RATE | ENVIRONMENT COEFFICIENT | DETERMINATION THRESHOLD* |
|---|---|---|
| 1% | 3.0 | 87.3 |
| 5% | 1.0 | 29.1 |
| 10% | 0.5 | 14.5 |

*IN CASE OF BEING IN SAME ENVIRONMENT AT ALL TIMES

FIG. 5C

| TEMPERATURE | ENVIRONMENT COEFFICIENT | DETERMINATION THRESHOLD* |
|---|---|---|
| 10°C | 1.5 | 43.6 |
| 20°C | 1.0 | 29.1 |
| 30°C | 0.5 | 14.5 |

FIG. 5D

| HUMIDITY | ENVIRONMENT COEFFICIENT | DETERMINATION THRESHOLD* |
|---|---|---|
| 10% | 2.0 | 58.2 |
| 50% | 1.0 | 29.1 |
| 80% | 0.5 | 14.5 |

FIG. 5E

| ABSOLUTE HUMIDITY | ENVIRONMENT COEFFICIENT | DETERMINATION THRESHOLD* |
|---|---|---|
| 25 g/m$^3$ | 2.0 | 58.2 |
| 11 g/m$^3$ | 1.0 | 29.1 |
| 5 g/m$^3$ | 0.5 | 14.5 |

FIG. 5F

| NUMBER OF DAYS FROM FIRST USE | ENVIRONMENT COEFFICIENT | DETERMINATION THRESHOLD* |
|---|---|---|
| 0 DAYS | 2.0 | 58.2 |
| 365 DAYS | 1.0 | 29.1 |
| 730 DAYS | 0.5 | 14.5 |

FIG. 10A

BASIC RUNNING DISTANCE OF PHOTORECEPTOR AT
TIMING OF DISPLAYING CLEANING GUIDE NOTIFICATION

| 18849.6 km | 25000 SHEETS |
|---|---|

FIG. 10B

| PRINTING RATE | ENVIRONMENT COEFFICIENT | DETERMINATION THRESHOLD* |
|---|---|---|
| 1% | 3.0 | 56549 |
| 5% | 1.0 | 18850 |
| 10% | 0.5 | 9425 |

*IN CASE OF BEING IN SAME ENVIRONMENT AT ALL TIMES

FIG. 10C

| TEMPERATURE | ENVIRONMENT COEFFICIENT | DETERMINATION THRESHOLD* |
|---|---|---|
| 10°C | 1.5 | 28274 |
| 20°C | 1.0 | 18850 |
| 30°C | 0.5 | 9425 |

FIG. 10D

| HUMIDITY | ENVIRONMENT COEFFICIENT | DETERMINATION THRESHOLD* |
|---|---|---|
| 10% | 2.0 | 37699 |
| 50% | 1.0 | 18850 |
| 80% | 0.5 | 9425 |

FIG. 10E

| ABSOLUTE HUMIDITY | ENVIRONMENT COEFFICIENT | DETERMINATION THRESHOLD* |
|---|---|---|
| 25 g/m$^3$ | 2.0 | 37699 |
| 11 g/m$^3$ | 1.0 | 18850 |
| 5 g/m$^3$ | 0.5 | 9425 |

FIG. 10F

| NUMBER OF DAYS FROM FIRST USE | ENVIRONMENT COEFFICIENT | DETERMINATION THRESHOLD* |
|---|---|---|
| 0 DAYS | 2.0 | 37699 |
| 365 DAYS | 1.0 | 18850 |
| 730 DAYS | 0.5 | 9425 |

FIG. 11A

BASIC RUNNING TIME OF PHOTORECEPTOR AT
TIMING OF DISPLAYING CLEANING GUIDE NOTIFICATION

| 29.1 hours | 25000 SHEETS |
|---|---|

FIG. 11B

| PRINTING RATE | ENVIRONMENT COEFFICIENT | DETERMINATION THRESHOLD* |
|---|---|---|
| 1% | 3.0 | 87.3 |
| 5% | 1.0 | 29.1 |
| 10% | 0.5 | 14.5 |

*IN CASE OF BEING IN SAME ENVIRONMENT AT ALL TIMES

FIG. 11C

| TEMPERATURE | ENVIRONMENT COEFFICIENT | DETERMINATION THRESHOLD* |
|---|---|---|
| 10°C | 1.5 | 43.6 |
| 20°C | 1.0 | 29.1 |
| 30°C | 0.5 | 14.5 |

FIG. 11D

| HUMIDITY | ENVIRONMENT COEFFICIENT | DETERMINATION THRESHOLD* |
|---|---|---|
| 10% | 2.0 | 58.2 |
| 50% | 1.0 | 29.1 |
| 80% | 0.5 | 14.5 |

FIG. 11E

| ABSOLUTE HUMIDITY | ENVIRONMENT COEFFICIENT | DETERMINATION THRESHOLD* |
|---|---|---|
| 25 g/m$^3$ | 2.0 | 58.2 |
| 11 g/m$^3$ | 1.0 | 29.1 |
| 5 g/m$^3$ | 0.5 | 14.5 |

FIG. 11F

| NUMBER OF DAYS FROM FIRST USE | ENVIRONMENT COEFFICIENT | DETERMINATION THRESHOLD* |
|---|---|---|
| 0 DAYS | 2.0 | 58.2 |
| 365 DAYS | 1.0 | 29.1 |
| 730 DAYS | 0.5 | 14.5 |

IMAGE FORMING APPARATUS INCLUDING DISPLAYED NOTIFICATION TO PROMPT CLEANING OF CHARGER AND STORAGE MEDIUM

BACKGROUND

1. Field

The present disclosure relates to an image forming apparatus and a storage medium storing a program, and specifically to an image forming apparatus that includes a charger for charging a surface of a photoreceptor and that forms an image by using an electrophotographic system and a storage medium storing a program therefor.

2. Description of the Related Art

In an image forming apparatus in the related art using an electrophotographic system, a surface of a photoreceptor is charged by a charger, and thereafter the charged surface of the photoreceptor is exposed in accordance with image information, thereby forming an electrostatic latent image on the surface of the photoreceptor. When foreign matter adheres to the charger, a black stripe is generated in an image, which is a problem, and as a result, a device that cleans soiling of a charger is known.

As an example of the related art, there has been proposed an image forming apparatus that includes a charger cleaner for removing soiling from a charger and a sensor for detecting soiling of the charger and that, in a case where the charger is soiled, removes an adhering material by using the charger cleaner (refer to Japanese Unexamined Patent Application Publication No. 2016-9001).

Thus, it is possible to detect and easily remove soiling of the charger.

Moreover, as another technique, a corona discharger that cleans an electrode by using a manual cleaning mechanism including a cleaning member which performs cleaning with the use of a pair of rotatable rollers provided to hold the electrode therebetween from both sides has been proposed (refer to Japanese Patent No. 3259515).

With such a configuration, cleaning is performed in such a manner that the pair of rotatable rollers hold the electrode therebetween from both of the sides, so that it is possible to perform cleaning easily without damaging the cleaning member and without deforming the electrode, which has a needle-like shape.

Though it is possible to easily detect and remove soiling of the charger by using the image forming apparatus of Japanese Unexamined Patent Application Publication No. 2016-9001 described above, at the time soiling adheres to the charger, defective charging of a photoreceptor may be caused and a defective image may be generated.

Moreover, the corona discharger of Japanese Patent No. 3259515 is able to easily clean the electrode by using the pair of rollers. However, similarly to the disclosure of Japanese Unexamined Patent Application Publication No. 2016-9001, when soiling adheres to the electrode, there is a problem that, since defective charging of a photoreceptor is caused, cleaning is performed after a black stripe is generated in an output image.

The disclosure provides an image forming apparatus that, by prompting cleaning of a charger before a black stripe which results from soiling of the charger is generated in an image, suppresses generation of a defective image, maintains image quality, and reduces the number of support calls regarding malfunction, and a storage medium storing a program therefor.

SUMMARY

According to an aspect of the disclosure, there is provided an image forming apparatus that forms an image by using an electrophotographic system. The image forming apparatus includes a charger for charging a surface of a photoreceptor, the charger being configured to be cleanable; a notification unit that causes a guidance notification (message) prompting cleaning of the charger to be displayed; and a notification determination unit that, in accordance with a threshold set in accordance with usage condition of the image forming apparatus, determines whether or not to cause the guidance notification to be displayed.

According to another aspect of the disclosure, there is provided a non-transitory computer readable storage medium storing a program causing a computer connectable to an image forming apparatus that includes a charger for charging a surface of a photoreceptor, the charger being configured to be cleanable, and that forms an image by using an electrophotographic system, to execute a process comprising causing a guidance notification prompting cleaning of the charger to be displayed and determining, in accordance with a threshold set in accordance with an environment coefficient obtained from usage condition of the image forming apparatus, whether or not to cause the guidance notification to be displayed.

BRIEF DESCRIPTION OF THE DRAWINGS

FIG. 5A is a table defining a discharging time of a charger, in accordance with which a determination threshold in the image forming apparatus is set;

FIG. 5B is a determination table with which an environment coefficient and a determination threshold of the discharging time of the charger are determined in accordance with a printing rate;

FIG. 5C is a determination table with which an environment coefficient and a determination threshold of the discharging time of the charger are determined in accordance with temperature;

FIG. 5D is a determination table with which an environment coefficient and a determination threshold of the discharging time of the charger are determined in accordance with humidity;

FIG. 5E is a determination table with which an environment coefficient and a determination threshold of the discharging time of the charger are determined in accordance with absolute humidity;

FIG. 5F is a determination table with which an environment coefficient and a determination threshold of the discharging time of the charger are determined in accordance with the number of days from the first use of the charger;

FIG. 10A is a table defining a running distance of a photoreceptor, in accordance with which a determination threshold in an image forming apparatus of a second embodiment is set;

FIG. 10B is a determination table with which an environment coefficient and a determination threshold of the running distance of the photoreceptor are determined in accordance with a printing rate;

FIG. 10C is a determination table with which an environment coefficient and a determination threshold of the running distance of the photoreceptor are determined in accordance with temperature;

FIG. 10D is a determination table with which an environment coefficient and a determination threshold of the running distance of the photoreceptor are determined in accordance with humidity;

FIG. 10E is a determination table with which an environment coefficient and a determination threshold of the running distance of the photoreceptor are determined in accordance with absolute humidity;

FIG. 10F is a determination table with which an environment coefficient and a determination threshold of the running distance of the photoreceptor are determined in accordance with the number of days from the first use of a charger;

FIG. 11A is a table defining running time of a photoreceptor, in accordance with which a determination threshold in an image forming apparatus of a third embodiment is set;

FIG. 11B is a determination table with which an environment coefficient and a determination threshold of the running time of the photoreceptor are determined in accordance with a printing rate;

FIG. 11C is a determination table with which an environment coefficient and a determination threshold of the running time of the photoreceptor are determined in accordance with temperature;

FIG. 11D is a determination table with which an environment coefficient and a determination threshold of the running time of the photoreceptor are determined in accordance with humidity;

FIG. 11E is a determination table with which an environment coefficient and a determination threshold of the running time of the photoreceptor are determined in accordance with absolute humidity; and FIG. 11F is a determination table with which an environment coefficient and a determination threshold of the running time of the photoreceptor are determined in accordance with the number of days from the first use of a charger.

DESCRIPTION OF THE EMBODIMENTS (First Embodiment)

Hereinafter, an embodiment of the disclosure will be described with reference to the drawings.

Figure 1:
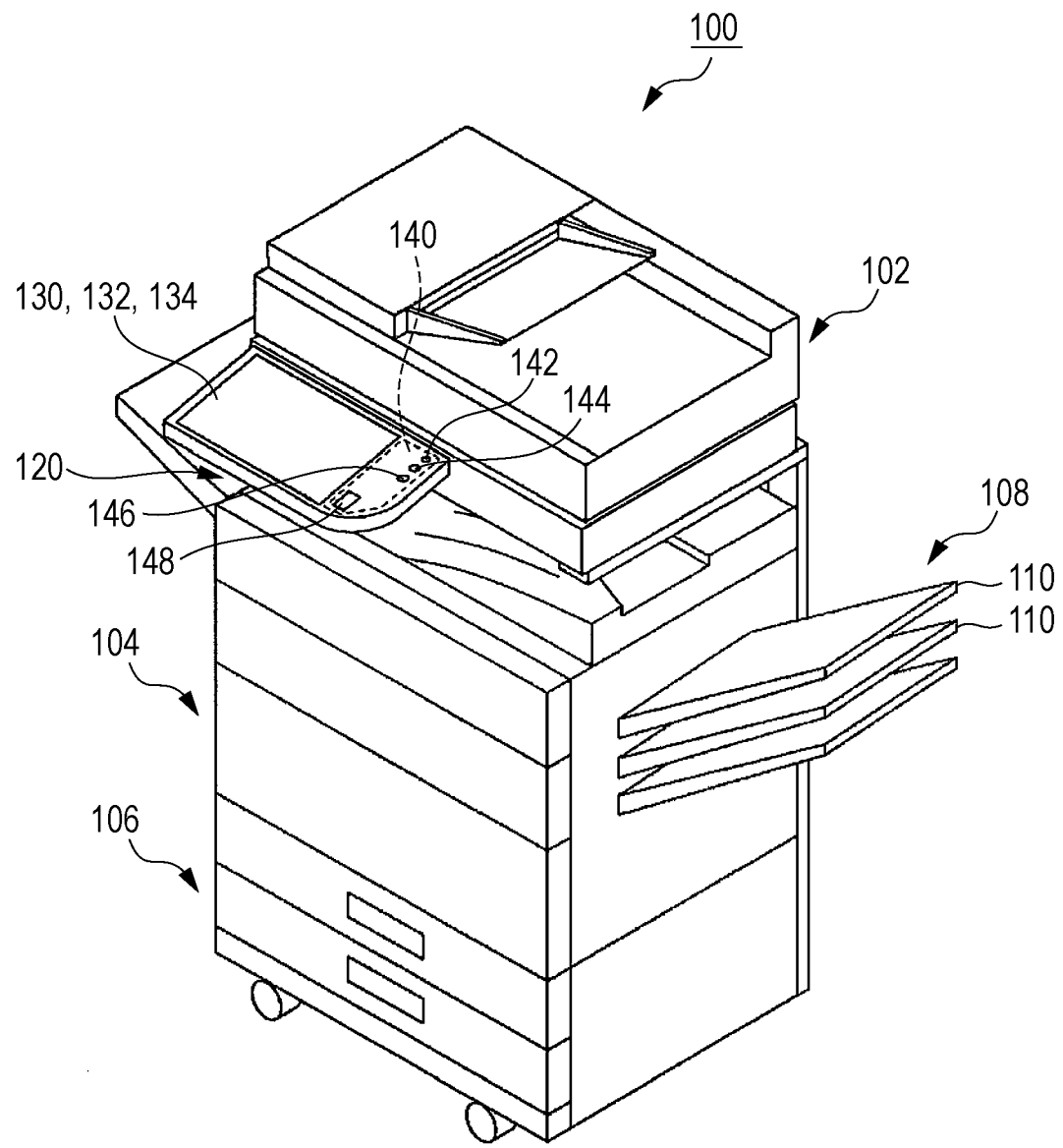
FIG. 1 illustrates an overall configuration of an image forming apparatus according to a first embodiment of the disclosure.
Figure 2:
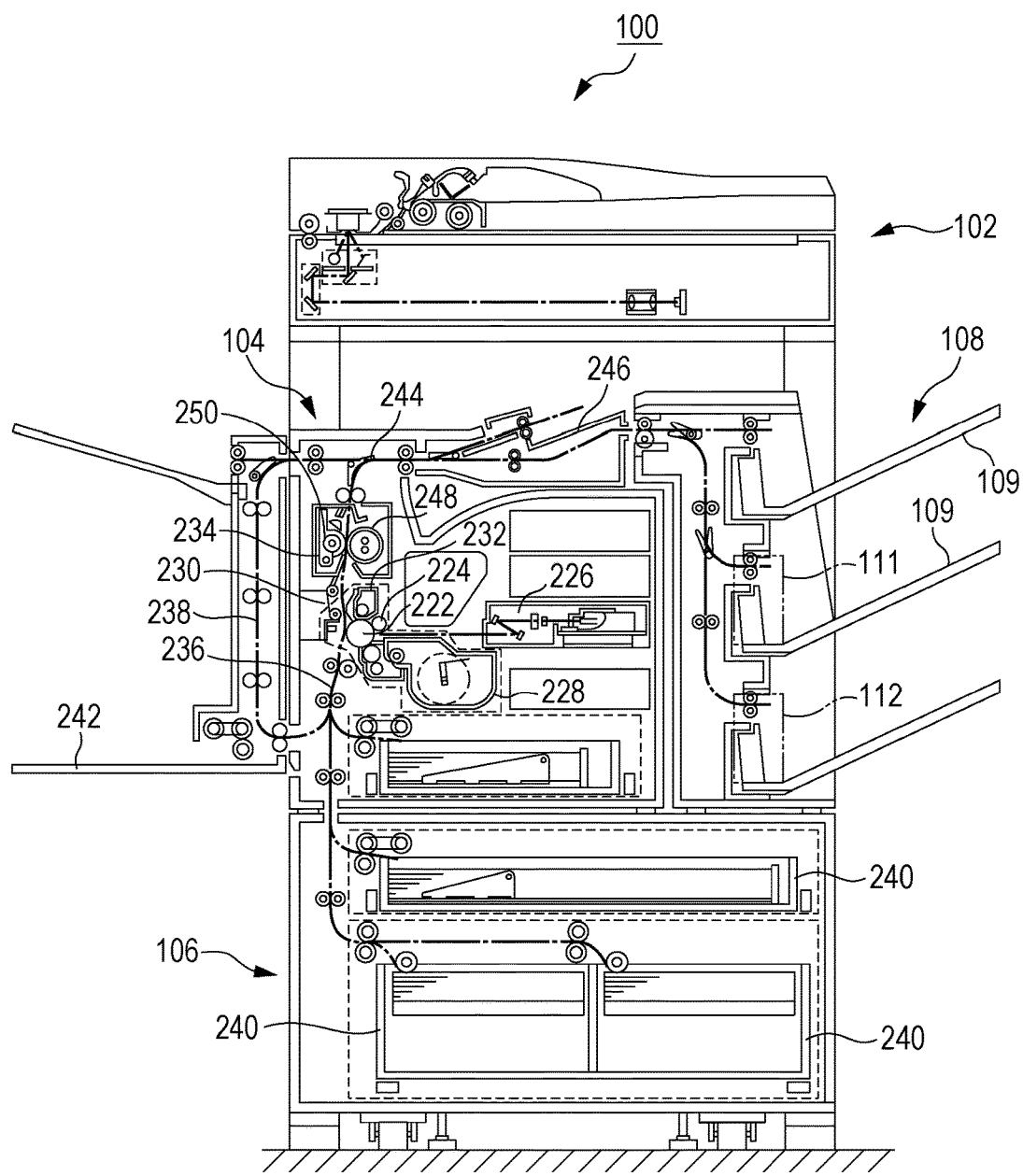
FIG. 2 illustrates an internal configuration of the image forming apparatus in a simplified manner.
Figure 3:
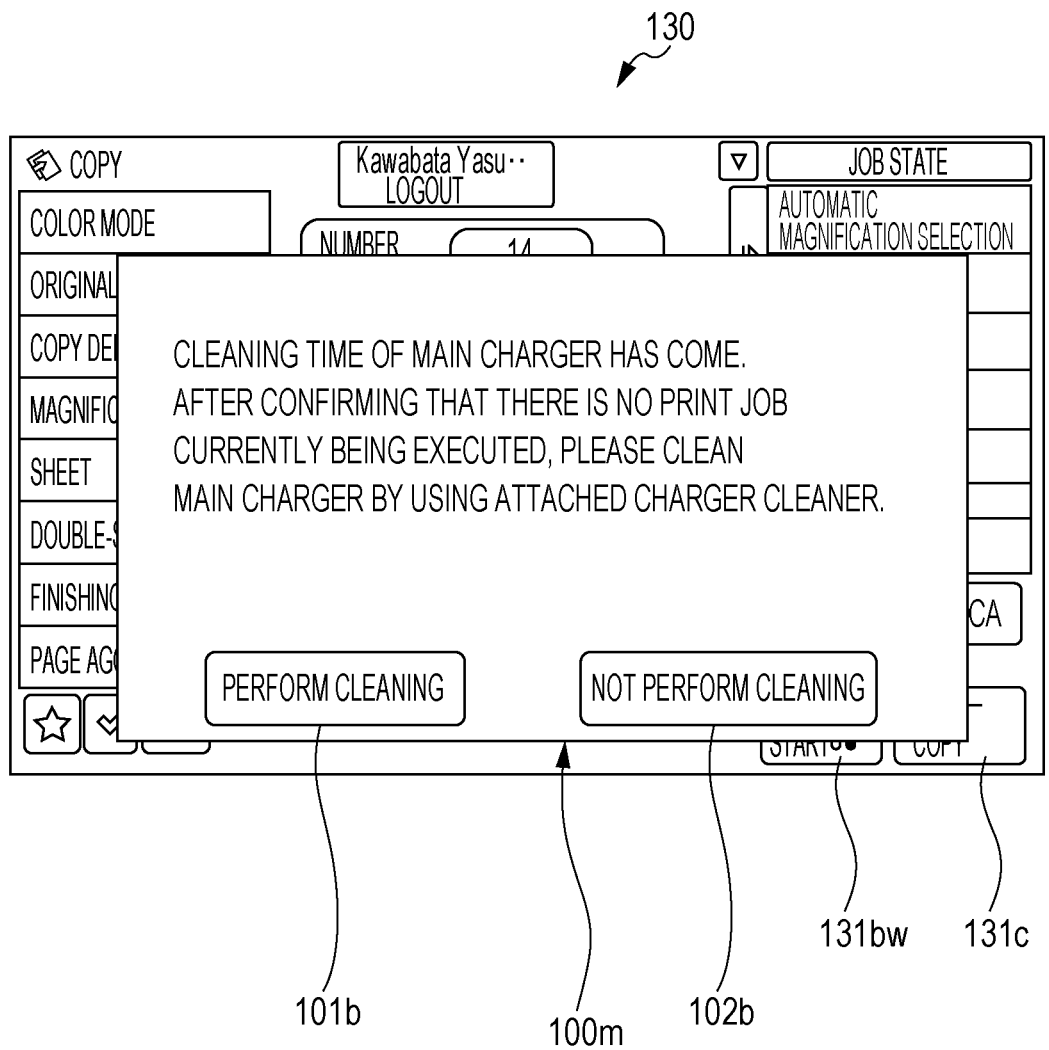
FIG. 3 illustrates a state where a guidance notification is displayed in a display portion of an operation unit that constitutes the image forming apparatus.

FIG. 1 illustrates an example according to the embodiment of the disclosure and illustrates an overall configuration of an image forming apparatus according to a first embodiment of the disclosure. FIG. 2 illustrates an internal configuration of the image forming apparatus in a simplified manner. FIG. 3 illustrates a state where a guidance notification is displayed in a display portion of an operation unit that constitutes the image forming apparatus.

In the first embodiment, as illustrated in FIG. 1 and FIG. 2, an image forming apparatus 100 that forms an image by using an electrophotographic system includes a charger 224 for charging a surface of a photoreceptor, and, in a case where the charger 224 is soiled, causes a guidance notification (message) prompting cleaning of the charger 224 to be displayed.

In the first embodiment, as illustrated in FIG. 3, a cleaning guide notification 100*m* is to be displayed on a touch panel display 130 of an operation unit 120 that constitutes the image forming apparatus 100.

First, the overall configuration of the image forming apparatus 100 will be described.

The image forming apparatus 100 forms an image on a predetermined sheet (recording sheet, recording medium) in accordance with image data which is transmitted from an external source.

As illustrated in FIG. 1, the image forming apparatus 100 includes an image reading portion 102, an image forming portion 104, a paper feed portion 106, a paper discharge processing device 108, and the operation unit 120.

The operation unit 120 is constituted by the touch panel display 130 as the display portion and a display operation portion 140. The touch panel display 130 is constituted by a display panel 132 which is composed of a liquid crystal panel or the like and a touch panel 134 which is arranged so as to superpose the display panel 132 and detect a position pressed by a finger of a user. The display operation portion 140 is constituted by a display lamp 142, a power button 144, an energy saving button 146, and a home button 148 by which a display screen of the touch panel display 130 is returned to the home screen on which an operation mode may be selected.

In this manner, the image forming apparatus 100 includes the touch panel display 130, as a main operation device, and the display operation portion 140, which is composed of the hardware buttons and the display lamp. The buttons of the display operation portion 140 (the power button 144, the energy saving button 146, and the home button 148) are hardware buttons, as opposed to software buttons on the touch panel display 130.

As illustrated in FIG. 2, the image forming portion 104 performs printing of an image of an original document, which is indicated by image data, on a recording medium (typically, a recording sheet) and includes a photoreceptor 222, the charger 224, a laser scanning unit (hereinafter, referred to as "LSU") 226, a developing device 228, a transfer device 230, a cleaning device 232, a fixing device 234, a destaticizing device (not illustrated), and the like. The charger 224 is configured to be cleanable by a user.

The image forming portion 104 is provided with a main conveyance path 236 and an inversion conveyance path 238, and a recording sheet fed from the paper feed portion 106 is conveyed along the main conveyance path 236.

The paper feed portion 106 draws out a recording sheet accommodated in a sheet cassette 240 or a recording sheet placed on a manual feed tray 242 one at a time, and sends the recording sheet to the main conveyance path 236 of the image forming portion 104.

While the recording sheet is conveyed along the main conveyance path 236 of the image forming portion 104, the recording sheet passes between the photoreceptor 222 and the transfer device 230 and further passes through the fixing device 234, and thereby, printing is performed on the recording sheet.

The photoreceptor 222 rotates in one direction, and a surface thereof is cleaned by using the cleaning device 232 and the destaticizing device and thereafter uniformly charged by using the charger 224.

The LSU 226 modulates laser light in accordance with the image data of a printing object, performs iterative scanning of the surface of the photoreceptor 222 in a main scanning direction with the laser light, and forms an electrostatic latent image on the surface of the photoreceptor 222.

The developing device 228 supplies toner to the surface of the photoreceptor 222 to develop the electrostatic latent image and forms a toner image on the surface of the photoreceptor 222.

The transfer device 230 transfers the toner image which is on the surface of the photoreceptor 222 onto the recording sheet which is passing between the transfer device 230 and the photoreceptor 222.

The fixing device 234 includes a heating roller 248 by which the recording sheet is heated and a pressure roller 250 by which the recording sheet is pressurized. The recording sheet is heated by the heating roller 248 and pressurized by the pressure roller 250, and thereby the toner image transferred onto the recording sheet is fixed onto the recording sheet. Control is performed so that a heater is heated by power supplied to the fixing device 234, and the temperature of the heating roller 248 becomes a temperature suitable for fixing. Note that, when a mode is shifted to an energy saving mode, the power to be supplied to the heater is stopped or reduced, for example.

A branching pawl 244 is disposed at a position at which the main conveyance path 236 and the inversion conveyance path 238 intersect. In a case where printing is performed on only one side of the recording sheet, the branching pawl 244 is positioned, and the recording sheet from the fixing device 234 is guided toward a paper discharge tray 246 or the paper discharge processing device 108 by the branching pawl 244.

In a case where printing is performed on both sides of the recording sheet, the branching pawl 244 is rotated in a predetermined direction, and the recording sheet is guided once toward a side of the paper discharge tray 246 and then switch-back conveyed to be guided toward the inversion conveyance path 238. The recording sheet passes along the inversion conveyance path 238 and is conveyed toward the main conveyance path 236 again with front and back sides thereof inverted. While the recording sheet is conveyed to the main conveyance path 236 again, printing is performed on the back side thereof, and the recording sheet is guided toward the paper discharge tray 246 or the paper discharge processing device 108.

The recording sheet on which printing is performed in the above-described manner is guided toward the paper discharge tray 246 or the paper discharge processing device 108 to be discharged to the paper discharge tray 246 or any of paper discharge trays 109 of the paper discharge processing device 108.

In the paper discharge processing device 108, processing in which a plurality of recording sheets are sorted and discharged to the respective paper discharge trays 109, processing in which each recording sheet is punched, or processing in which recording sheets are stapled is performed. For example, in a case where plural copies of a printed material are created, recording sheets are respectively sorted and discharged to the paper discharge trays 109 so that one copy of the printed material is assigned to each of the paper discharge trays 109, and, in each of the paper discharge trays 109, punch processing by a punching unit 111 or staple processing by a stapling unit 112 is performed with respect to the recording sheets on the paper discharge tray 109, and the printed material is then created.

In the a cleaning guide notification 100m which is displayed on the touch panel display 130, a first operation button 101b and a second operation button 102b each of which functions as a soft button are displayed as illustrated in FIG. 3.

The first operation button 101b is a button for informing that cleaning has been performed, and the second operation button 102b is a button for informing that cleaning has not been performed.

In the first embodiment, when the second operation button 102b is pressed, the cleaning guide notification 100m disappears from the display screen. The cleaning guide notification 100m may be displayed again when the home screen or a screen related to printing is displayed. That is, a notification for informing that the charger 224 is to be cleaned is displayed when an image is formed.

When the cleaning guide notification 100m is again displayed, notification that the charger 224 has not yet been cleaned may be emphasized by displaying a cleaning guide notification, which is to be displayed on the touch panel display 130, as a guidance notification which is different from the cleaning guide notification 100m that was displayed beforehand.

Moreover, in the first embodiment, as illustrated in FIG. 3, the cleaning guide notification 100m is displayed in a superposed manner so as to obstruct an operation button 131bw for outputting a monochrome image and an operation button 131c for outputting a color image.

By displaying the cleaning guide notification 100m in this manner, a defective output image is not generated because an image output operation may not be performed before cleaning of the charger 224 is complete.

Next, feature configuration of the image forming apparatus 100 will be described with reference to a block diagram.

Figure 4:
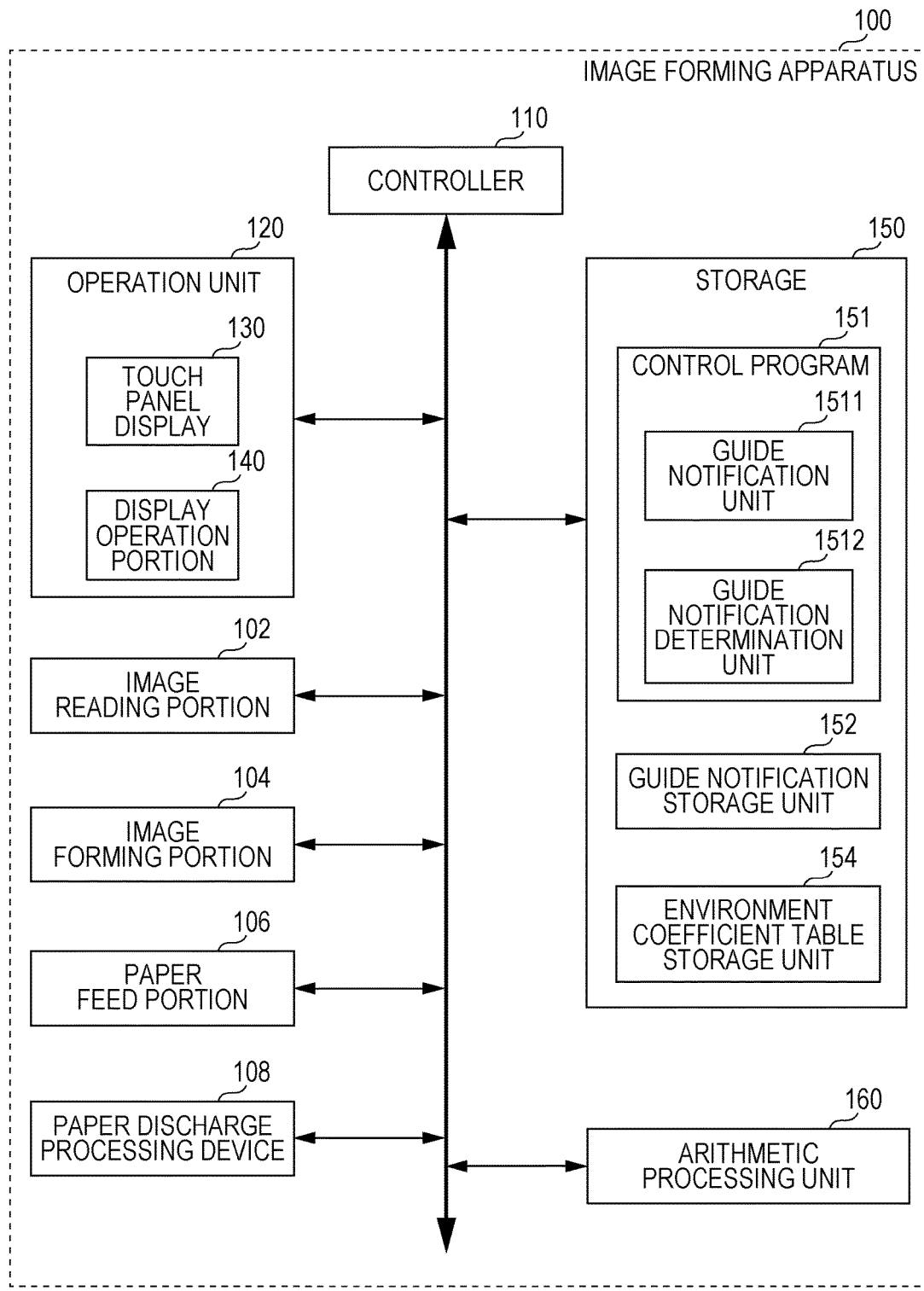
FIG. 4 is a block diagram illustrating the configuration of the image forming apparatus.

FIG. 4 is a block diagram illustrating the configuration of the image forming apparatus 100 of the first embodiment.

As illustrated in FIG. 4, the image forming apparatus 100 includes a controller 110 which controls an operation of the image forming apparatus 100, the operation unit 120, the image reading portion 102 which reads an image by using a scanner, the image forming portion 104, the paper feed portion 106, the paper discharge processing device 108, a storage 150, an arithmetic processing unit 160, and the like as electrical constituents.

In the first embodiment, when the charger 224 is soiled, the controller 110 causes a cleaning guide notification 100m which prompts cleaning of the charger 224 to be displayed.

The storage 150 is a functional unit that stores data and various programs which are used for operation of the image forming apparatus 100. The storage 150 is composed of, for example, semiconductor memory, a hard disk drive (HDD), or the like.

In the first embodiment, the storage 150 includes, as feature configuration, a control program 151 which controls operation of each portion, a guide notification storage unit 152, and an environment coefficient table storage unit 154.

The control program 151 includes a guide notification unit 1511 which causes a cleaning guide notification to be displayed and a guide notification determination unit 1512 which determines whether or not to display the cleaning guide notification.

In the guide notification storage unit 152, a message for prompting cleaning is stored in advance. There may be a plurality of messages so as to correspond to the degree of soiling of the charger 224.

The environment coefficient table storage unit 154 stores therein a determination table used for setting a threshold (hereinafter, referred to as a "determination threshold") which is used to determine whether or not to display a cleaning guide notification in accordance with an environment coefficient obtained from usage condition of the image forming apparatus 100.

Here, the environment coefficient and the determination threshold will be described.

FIG. 5A is a table defining discharging time of a charger, in accordance with which a determination threshold in an image forming apparatus of the first embodiment is set. FIG. 5B is a determination table with which an environment coefficient and a determination threshold of the discharging time of the charger are determined in accordance with a printing rate. FIG. 5C is a determination table with which an environment coefficient and a determination threshold of the discharging time of the charger are determined in accordance with temperature. FIG. 5D is a determination table with which an environment coefficient and a determination threshold of the discharging time of the charger are determined in accordance with humidity. FIG. 5E is a determination table with which an environment coefficient and a determination threshold of the discharging time of the charger are determined in accordance with absolute humidity. FIG. 5F is a determination table with which an environment coefficient and a determination threshold of the discharging time of the charger are determined in accordance with the number of days from the first use of the charger.

Each environment coefficient is determined in accordance with a printing rate, temperature, humidity, absolute humidity, the number of days from the first use of the charger, or the like each of which serves as environment requirement. The determination threshold is determined in accordance with a value of the environment coefficient so as to correspond to discharging time of the charger, a running distance of the photoreceptor, running time (usage time) of the photoreceptor, or the like.

In the first embodiment, the determination thresholds are set in accordance with the values of the environment coefficients, which correspond to the discharging time of the charger.

In the first embodiment, basic discharging time of the charger at a time of determining a timing of displaying a cleaning guide notification is set to be 25000 sheets and 29.1 hours in terms of A4 paper, as illustrated in FIG. 5A.

The determination thresholds are set in accordance with the values of the environment coefficients, which respectively correspond to a printing rate, temperature, humidity, absolute humidity, and the number of days from the first use of the charger. Then, the determination thresholds are determined in accordance with a cleaning guide notification count obtained by multiplying the environment coefficients of a case where the charger is used on each condition and integrating the resultants.

As illustrated in FIG. 5B, the determination table of the environment coefficient and the determination threshold which correspond to a printing rate are as follows. When the printing rate is 1 (%), the environment coefficient is "3.0" and the determination threshold of the discharging time of the charger is "87.3". When the printing rate is 5 (%), the environment coefficient is "1.0" and the determination threshold of the discharging time of the charger is "29.1". When the printing rate is 10 (%), the environment coefficient is "0.5" and the determination threshold of the discharging time of the charger is "14.5".

As illustrated in FIG. 5C, the determination table of the environment coefficient and the determination threshold which correspond to temperature are as follows. When the temperature is 10° C., the environment coefficient is "1.5" and the determination threshold of the discharging time of the charger is "43.6". When the temperature is 20° C., the environment coefficient is "1.0" and the determination threshold of the discharging time of the charger is "29.1". When the temperature is 30° C., the environment coefficient is "0.5" and the determination threshold of the discharging time of the charger is "14.5".

As illustrated in FIG. 5D, the determination table of the environment coefficient and the determination threshold which correspond to humidity are as follows. When the humidity is 10 (%), the environment coefficient is "2.0" and the determination threshold of the discharging time of the charger is "58.2". When the humidity is 50 (%), the environment coefficient is "1.0" and the determination threshold of the discharging time of the charger is "29.1". When the humidity is 80 (%), the environment coefficient is "0.5" and the determination threshold of the discharging time of the charger is "14.5".

As illustrated in FIG. 5E, the determination table of the environment coefficient and the determination threshold which correspond to absolute humidity are as follows. When the absolute humidity is 25 $g/m^3$, the environment coefficient is "2.0" and the determination threshold of the discharging time of the charger is "58.2". When the absolute humidity is 11 $g/m^3$, the environment coefficient is "1.0" and the determination threshold of the discharging time of the charger is "29.1". When the absolute humidity is 5 $g/m^3$, the environment coefficient is "0.5" and the determination threshold of the discharging time of the charger is "14.5".

As illustrated in FIG. 5F, the determination table of the environment coefficient and the determination threshold which correspond to the number of days from the first use of the charger are as follows. When the number of days from start of the use is 0, the environment coefficient is "2.0" and the determination threshold of the discharging time of the charger is "58.2". When the number of days from start of the use is 365, the environment coefficient is "1.0" and the determination threshold of the discharging time of the charger is "29.1". When the number of days from start of the use is 730, the environment coefficient is "0.5" and the determination threshold of the discharging time of the charger is "14.5".

As described above, each determination threshold is determined in accordance with the determination table of the determination threshold of the discharging time of the charger, which corresponds to the environment coefficient based on charging time of the charger 224.

Next, a process in which a cleaning guide notification of the charger is displayed in the image forming apparatus 100 of the first embodiment will be described in accordance with a flowchart.

Figure 6:
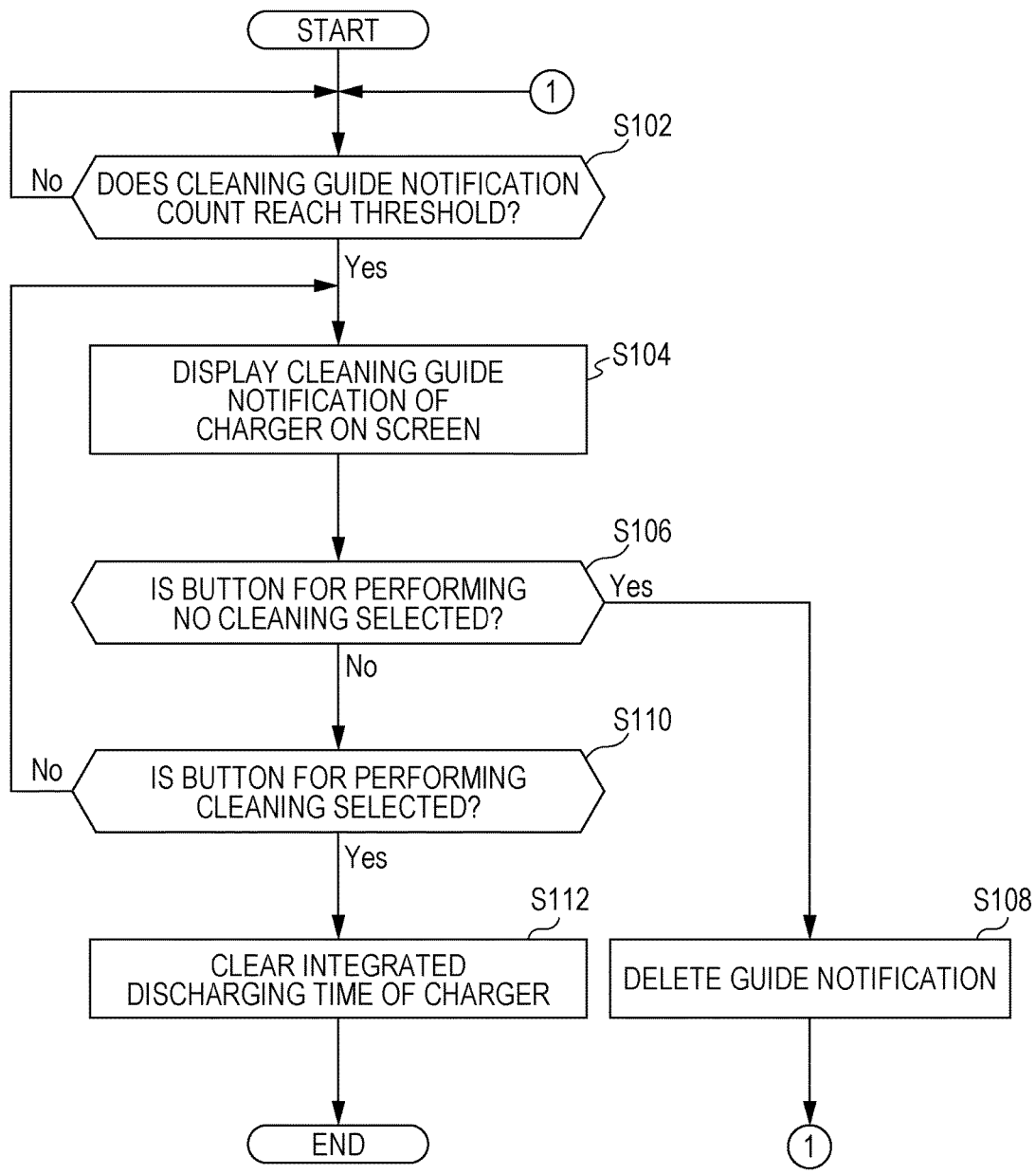
FIG. 6 is a flowchart illustrating a process in which display of a cleaning guide notification of the charger is performed in the image forming apparatus.

FIG. 6 is a flowchart illustrating the process in which a cleaning guide notification of the charger is displayed in the image forming apparatus 100 of the first embodiment.

In the image forming apparatus 100, in a case where a guide notification prompting cleaning is to be displayed when the charger 224 is soiled, whether or not the cleaning guide notification count reaches a threshold is determined first as illustrated in FIG. 6 (step S102).

In a case where, at step S102, it is determined that the cleaning guide notification count reaches the threshold, cleaning guide which prompts cleaning of the charger is displayed on the display screen of the touch panel display 130 (step S104).

Then, whether or not the second operation button 102b for informing that cleaning has not been performed is selected is determined (step S106). At step S106, in a case where the second operation button 102b for informing that cleaning has not been performed is selected, the cleaning guide notification 100m is deleted from the screen of the touch panel display 130 (step S108), and the procedure returns to step S102.

On the other hand, in a case where the second operation button 102b for informing that cleaning has not been performed is not selected at step S106, whether or not the first operation button 101b for informing that cleaning has been performed is selected is determined (step S110). In a case where the first operation button 101b for informing that cleaning has been performed is selected at step S110, integrated discharging time of the charger is cleared (step S112) and cleaning processing of the charger 224 ends.

Next, a process in which the cleaning guide notification count of the charger 224 is calculated by the image forming apparatus 100 of the first embodiment will be described in accordance with a flowchart.

Figure 7:
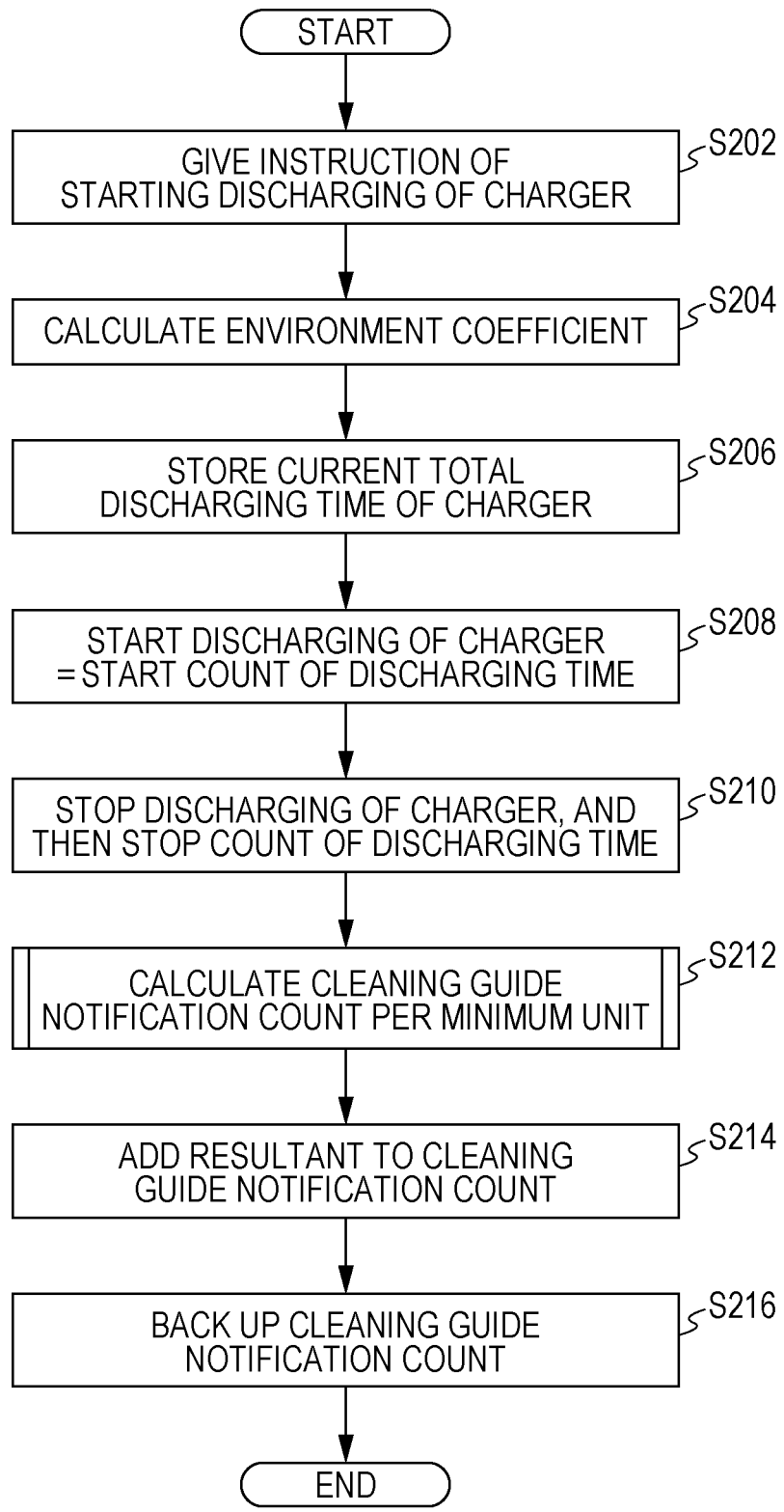
FIG. 7 is a flowchart illustrating a process in which a cleaning guide notification count of the charger is calculated by the image forming apparatus.

FIG. 7 is a flowchart illustrating the process in which the cleaning guide notification count of the charger is calculated by the image forming apparatus 100 of the first embodiment.

In the image forming apparatus 100, in a case of calculating the cleaning guide notification count of the charger 224, instruction of starting discharging of the charger is given first as illustrated in FIG. 7 (step S202), and an environment coefficient is calculated (step S204). Then, current total discharging time of the charger is stored (step S206), and discharging of the charger is started and count of discharging time is started (step S208).

Thereafter, discharging of the charger is stopped, and then count of discharging time is stopped (step S210). A cleaning guide notification count per minimum unit is calculated (step S212), and added to integrated cleaning guide notification count (step S214). The integrated cleaning guide notification count is backed up (step S216), and integrating processing of the cleaning guide notification counter ends.

With the configuration described above, according to the first embodiment, in the image forming apparatus 100, since the charger 224 is configured to be cleanable, and the control program 151 includes the guide notification unit 1511 which causes the cleaning guide notification 100m prompting cleaning of the charger 224 to be displayed and the guide notification determination unit 1512 which determines whether or not to cause the cleaning guide notification to be displayed in accordance with the determination threshold that is set in accordance with the cleaning guide notification count which is integrated in accordance with the environment coefficient obtained from usage condition of the image forming apparatus 100, and, when the determination threshold is exceeded, the cleaning guide notification 100m is caused to be displayed on the screen of the touch panel display 130, the cleaning guide notification 100m prompting cleaning of the charger 224 is displayed on the screen of the touch panel display 130 of the image forming apparatus 100 before a black stripe which results from soiling of the charger 224 is generated on an image, and a user is prompted to clean the charger 224. Accordingly, it is possible to maintain image quality and reduce the number of support calls regarding malfunction.

Since the determination threshold is determined with the determination table which is set in accordance with a value of the environment coefficient, which corresponds to discharging time of the charger, in the first embodiment, it is possible to determine a degree of soiling of the charger 224 in accordance with the discharging time of the charger 224.

Note that, though the cleaning guide notification 100m is displayed on the screen of the touch panel display 130 of the image forming apparatus 100 in the first embodiment, there is no limitation thereto.

For example, as a method of displaying a cleaning guide notification, an e-mail or the like may be used. Moreover, alert display may be performed on the web.

(Modified Example)

Hereinafter, modified examples will be described.

Figure 8:
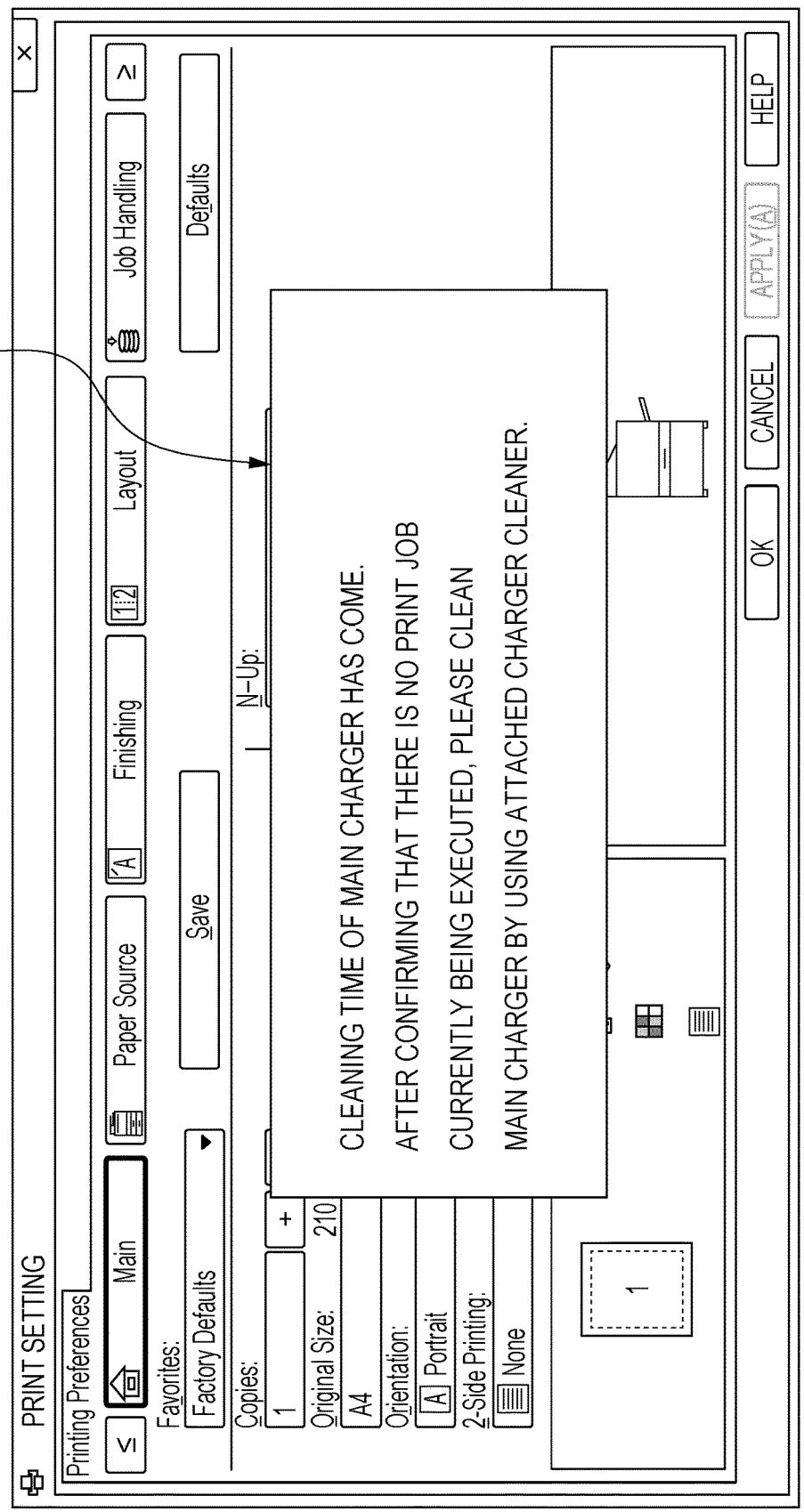
FIG. 8 illustrates a modified example 1 in which a cleaning guide notification is displayed by a printer driver in the image forming apparatus.
Figure 9:
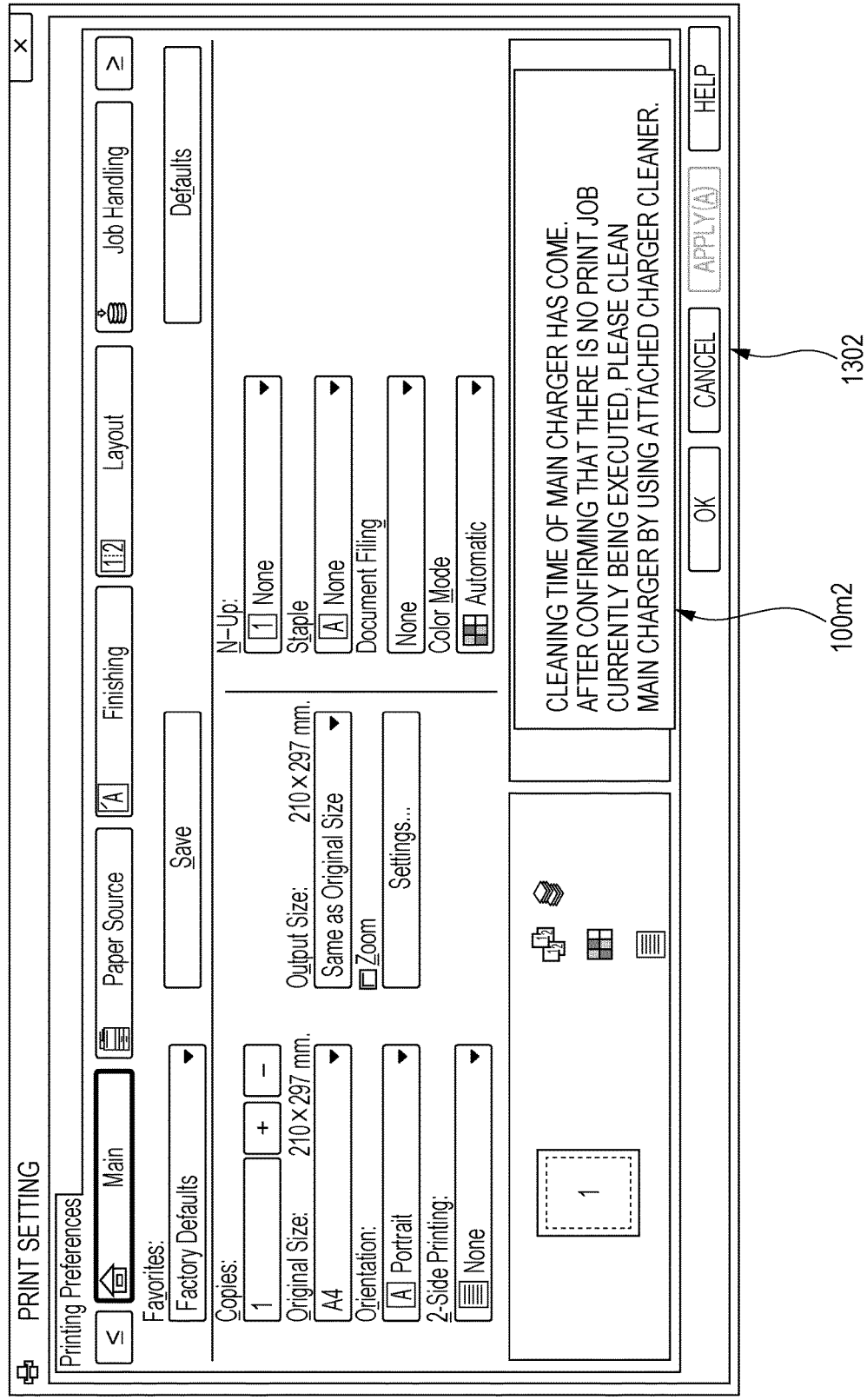
FIG. 9 illustrates a modified example 2 in which a cleaning guide notification is displayed by the printer driver in the image forming apparatus.

FIG. 8 illustrates a modified example 1 in which cleaning guide notification is displayed by a printer driver in the image forming apparatus 100 of the first embodiment, and FIG. 9 illustrates a modified example 2 in which cleaning guide notification is displayed by the printer driver in the image forming apparatus 100.

As the modified example 1, for example, a cleaning guide notification 100m1 may be displayed near the center of a display screen 1301 by the printer driver in a superposed manner as illustrated in FIG. 8.

As the modified example 2, a cleaning guide notification 100m2 may be displayed near an operation portion 1302 of the display screen 1301 by the printer driver as illustrated in FIG. 9.

(Second Embodiment)

Next, a second embodiment will be described.

In the second embodiment, a determination threshold with which a cleaning guide notification is determined is set in accordance with a value of an environment coefficient, which corresponds to a running distance of the photoreceptor 222, instead of discharging time of the charger which is used in the first embodiment.

FIG. 10A is a table defining the running distance of the photoreceptor, in accordance with which a determination threshold in the image forming apparatus of the second embodiment is set. FIG. 10B is a determination table with which an environment coefficient and a determination threshold of the running distance of the photoreceptor are determined in accordance with a printing rate. FIG. 10C is a determination table with which an environment coefficient and a determination threshold of the running distance of the photoreceptor are determined in accordance with temperature. FIG. 10D is a determination table with which an environment coefficient and a determination threshold of the running distance of the photoreceptor are determined in accordance with humidity. FIG. 10E is a determination table with which an environment coefficient and a determination threshold of the running distance of the photoreceptor are determined in accordance with absolute humidity. FIG. 10F is a determination table with which an environment coefficient and a determination threshold of the running distance of the photoreceptor are determined in accordance with the number of days from the first use of the charger.

In the second embodiment, the determination thresholds are set in accordance with the values of the environment coefficients, which correspond to the running distance of the photoreceptor 222.

In the second embodiment, a basic running distance of the photoreceptor at a time of determining a timing of displaying cleaning guide notification is set to be 25000 sheets and 18849.6 km in terms of A4 paper as illustrated in FIG. 10A.

The determination thresholds are set in accordance with the values of the environment coefficients, which respectively correspond to a printing rate, temperature, humidity, absolute humidity, and the number of days of using the charger. Then, the determination thresholds are determined in accordance with cleaning guide notification count obtained by multiplying the environment coefficients of a case where the charger is used on each condition and integrating the resultants.

As illustrated in FIG. 10B, the determination table of the environment coefficient and the determination threshold which correspond to a printing rate are as follows. When the printing rate is 1 (%), the environment coefficient is "3.0" and the determination threshold of the running distance of the photoreceptor is "56549". When the printing rate is 5 (%), the environment coefficient is "1.0" and the determination threshold of the running distance of the photoreceptor is "18850". When the printing rate is 10 (%), the environment coefficient is "0.5" and the determination threshold of the running distance of the photoreceptor is "9425".

As illustrated in FIG. 10C, the determination table of the environment coefficient and the determination threshold which correspond to temperature are as follows. When the temperature is 10° C., the environment coefficient is "1.5" and the determination threshold of the running distance of the photoreceptor is "28274". When the temperature is 20° C., the environment coefficient is "1.0" and the determination threshold of the running distance of the photoreceptor is "18850". When the temperature is 30° C., the environment coefficient is "0.5" and the determination threshold of the running distance of the photoreceptor is "9425".

As illustrated in FIG. 10D, the determination table of the environment coefficient and the determination threshold which correspond to humidity are as follows. When the humidity is 10 (%), the environment coefficient is "2.0" and the determination threshold of the running distance of the photoreceptor is "37699". When the humidity is 50 (%), the environment coefficient is "1.0" and the determination threshold of the running distance of the photoreceptor is "18850". When the humidity is 80 (%), the environment coefficient is "0.5" and the determination threshold of the running distance of the photoreceptor is "9425".

As illustrated in FIG. 10E, the determination table of the environment coefficient and the determination threshold which correspond to absolute humidity are as follows. When the absolute humidity is 25 g/m$^3$, the environment coefficient is "2.0" and the determination threshold of the running distance of the photoreceptor is "37699". When the absolute humidity is 11 g/m$^3$, the environment coefficient is "1.0" and the determination threshold of the running distance of the photoreceptor is "18850". When the absolute humidity is 5 g/m$^3$, the environment coefficient is "0.5" and the determination threshold of the running distance of the photoreceptor is "9425".

As illustrated in FIG. 10F, the determination table of the environment coefficient and the determination threshold which correspond to the number of days from the first use of the charger are as follows. When the number of days from start of the use is 0, the environment coefficient is "2.0" and the determination threshold of the running distance of the photoreceptor is "37699". When the number of days from start of the use is 365, the environment coefficient is "1.0" and the determination threshold of the running distance of the photoreceptor is "18850". When the number of days from start of the use is 730, the environment coefficient is "0.5" and the determination threshold of the running distance of the photoreceptor is "9425".

As described above, according to the second embodiment, in the image forming apparatus 100, it is possible to determine a degree of soiling of the charger 224 in accordance with the running distance of the photoreceptor 222 by storing the determination tables corresponding to the running distance of the photoreceptor 222 in advance.

(Third Embodiment)

Next, a third embodiment will be described.

In the third embodiment, a determination threshold with which a cleaning guide notification is determined is set in accordance with a value of an environment coefficient, which corresponds to running time of the photoreceptor 222, instead of discharging time of the charger which is used in the first embodiment.

FIG. 11A is a table defining running time of the photoreceptor, in accordance with which a determination threshold in the image forming apparatus of the third embodiment is set. FIG. 11B is a determination table with which an environment coefficient and a determination threshold of the running time of the photoreceptor are determined in accordance with a printing rate. FIG. 11C is a determination table with which an environment coefficient and a determination threshold of the running time of the photoreceptor are determined in accordance with temperature. FIG. 11D is a determination table with which an environment coefficient and a determination threshold of the running time of the photoreceptor are determined in accordance with humidity. FIG. 11E is a determination table with which an environment coefficient and a determination threshold of the running time of the photoreceptor are determined in accordance with absolute humidity. FIG. 11F is a determination table with which an environment coefficient and a determination threshold of the running time of the photoreceptor are determined in accordance with the number of days from the first use of the charger.

In the third embodiment, the determination thresholds are set in accordance with the values of the environment coefficients, which correspond to the running time of the photoreceptor 222.

In the third embodiment, basic running time of the photoreceptor at a time of determining a timing of displaying a cleaning guide notification is set to be 25000 sheets and 29.1 hours in terms of A4 paper as illustrated in FIG. 11A.

The determination thresholds are set in accordance with the values of the environment coefficients, which respectively correspond to a printing rate, temperature, humidity, absolute humidity, and the number of days of using the charger. Then, the determination thresholds are determined in accordance with a cleaning guide notification count obtained by multiplying the environment coefficients of a case where the charger is used on each condition and integrating the resultants.

As illustrated in FIG. 11B, the determination table of the environment coefficient and the determination threshold which correspond to a printing rate are as follows. When the printing rate is 1 (%), the environment coefficient is "3.0" and the determination threshold of the running time of the photoreceptor is "87.3". When the printing rate is 5 (%), the environment coefficient is "1.0" and the determination threshold of the running time of the photoreceptor is "29.1". When the printing rate is 10 (%), the environment coefficient is "0.5" and the determination threshold of the running time of the photoreceptor is "14.5".

As illustrated in FIG. 11C, the determination table of the environment coefficient and the determination threshold which correspond to temperature are as follows. When the temperature is 10° C., the environment coefficient is "1.5"

and the determination threshold of the running time of the photoreceptor is "43.6". When the temperature is 20° C., the environment coefficient is "1.0" and the determination threshold of the running time of the photoreceptor is "29.1". When the temperature is 30° C., the environment coefficient is "0.5" and the determination threshold of the running time of the photoreceptor is "14.5".

As illustrated in FIG. 11D, the determination table of the environment coefficient and the determination threshold which correspond to humidity are as follows. When the humidity is 10 (%), the environment coefficient is "2.0" and the determination threshold of the running time of the photoreceptor is "58.2". When the humidity is 50 (%), the environment coefficient is "1.0" and the determination threshold of the running time of the photoreceptor is "29.1". When the humidity is 80 (%), the environment coefficient is "0.5" and the determination threshold of the running time of the photoreceptor is "14.5".

As illustrated in FIG. 11E, the determination table of the environment coefficient and the determination threshold which correspond to absolute humidity are as follows. When the absolute humidity is 25 $g/m^3$, the environment coefficient is "2.0" and the determination threshold of the running time of the photoreceptor is "58.2". When the absolute humidity is 11 $g/m^3$, the environment coefficient is "1.0" and the determination threshold of the running time of the photoreceptor is "29.1". When the absolute humidity is 5 $g/m^3$, the environment coefficient is "0.5" and the determination threshold of the running time of the photoreceptor is "14.5".

As illustrated in FIG. 11F, the determination table of the environment coefficient and the determination threshold which correspond to the number of days from the first use of the charger are as follows. When the number of days from start of the use is 0, the environment coefficient is "2.0" and the determination threshold of the running time of the photoreceptor is "58.2". When the number of days from start of the use is 365, the environment coefficient is "1.0" and the determination threshold of the running time of the photoreceptor is "29.1". When the number of days from start of the use is 730, the environment coefficient is "0.5" and the determination threshold of the running time of the photoreceptor is "14.5".

As described above, according to the third embodiment, in the image forming apparatus 100, it is possible to determine a degree of soiling of the charger 224 in accordance with the running time of the photoreceptor 222 by storing the determination tables corresponding to the running time of the photoreceptor 222 in advance.

Note that, though the degree of soiling of the charger is determined more accurately by setting the determination thresholds with the use of the environment coefficients in the above-described embodiments, when the degree of soiling of the charger is determined in a simplified manner, the degree of soiling of the charger may be determined by setting the determination thresholds simply in accordance with the number of sheets for printing or the number of days from the first use of the charger or the image forming apparatus.

As described above, the disclosure is not limited to each of the embodiments described above, and may be modified in various manners within the scope of the embodiments. That is, an embodiment achieved by combining techniques which are appropriately modified within a range not departed from the gist of the disclosure is also encompassed in the technical scope of the disclosure.

The present disclosure contains subject matter related to that disclosed in Japanese Priority Patent Application JP 2016-106233 filed in the Japan Patent Office on May 27, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus that forms an image by using an electrophotographic system, the image forming apparatus comprising:
    a charger for charging a surface of a photoreceptor, the charger being configured to be cleanable;
    a notification unit that causes a guidance notification prompting cleaning of the charger to be displayed; and
    a notification determination unit that, in accordance with a threshold set in accordance with usage condition of the image forming apparatus, determines whether or not to cause the guidance notification to be displayed; wherein
    the guidance notification is displayed on a display portion of the image forming apparatus so as to obstruct an output operation button with which output processing is performed;
    the guidance notification includes an operation button that is operable on a screen of the display portion of the image forming apparatus and causes the guidance notification to disappear from the display portion of the image forming apparatus in response to the operation button being operated; and
    the guidance notification is selected from a plurality of guidance notifications in accordance with the usage condition of the image forming apparatus.

2. The image forming apparatus according to claim 1, wherein
    the threshold is set in accordance with an environment coefficient that is applied in accordance with usage condition of the image forming apparatus.

3. The image forming apparatus according to claim 2, wherein
    the environment coefficient includes at least one of temperature, humidity, printing rate, and number of days from first use of the image forming apparatus.

4. The image forming apparatus according to claim 1, wherein
    the notification unit causes the guidance notification to be displayed on the display portion of the image forming apparatus.

5. The image forming apparatus according to claim 1, wherein
    the notification unit causes the guidance notification to be displayed by using a printer driver.

6. The image forming apparatus according to claim 1, wherein
    the threshold is set in accordance with a discharging time of the charger.

7. The image forming apparatus according to claim 1, wherein
    the threshold is set in accordance with a usage distance of the photoreceptor.

8. The image forming apparatus according to claim 1, wherein
    the threshold is set in accordance with a usage time of the photoreceptor.

9. The image forming apparatus according to claim 1, wherein
the guidance notification includes an additional operation button that is operable on the screen of the display portion of the image forming apparatus and informs that cleaning has been performed.

10. A non-transitory computer readable storage medium storing a program causing a computer connectable to an image forming apparatus that includes a charger for charging a surface of a photoreceptor, the charger being configured to be cleanable, and that forms an image by using an electrophotographic system, to execute a process comprising:
causing a guidance notification prompting cleaning of the charger to be displayed;
determining, in accordance with a threshold set in accordance with an environment coefficient obtained from usage condition of the image forming apparatus, whether or not to cause the guidance notification to be displayed;
displaying the guidance notification on a display portion of the image forming apparatus so as to obstruct an output operation button with which output processing is performed; and
selecting the guidance notification from a plurality of guidance notifications in accordance with the usage condition of the image forming apparatus; wherein
the guidance notification includes an operation button that is operable on a screen of the display portion of the image forming apparatus and causes the guidance notification to disappear from the display portion of the image forming apparatus in response to the operation button being operated.

* * * * *